United States Patent
Brands

(10) Patent No.: US 10,341,329 B2
(45) Date of Patent: Jul. 2, 2019

(54) METHOD FOR GENERATING A PUBLIC/PRIVATE KEY PAIR AND PUBLIC KEY CERTIFICATE FOR AN INTERNET OF THINGS DEVICE

(71) Applicant: NXP B.V., Eindhoven (NL)

(72) Inventor: Jan Rene Brands, Eindhoven (NL)

(73) Assignee: NXP B.V., Eindhoven (NL)

( * ) Notice: Subject to any disclaimer, the term of this patent is extended or adjusted under 35 U.S.C. 154(b) by 187 days.

(21) Appl. No.: 15/641,480

(22) Filed: Jul. 5, 2017

(65) Prior Publication Data

US 2019/0014104 A1    Jan. 10, 2019

(51) Int. Cl.
*H04L 29/06*  (2006.01)
*G06F 21/73*  (2013.01)
(Continued)

(52) U.S. Cl.
CPC .......... *H04L 63/0823* (2013.01); *G06F 21/73* (2013.01); *G06F 21/76* (2013.01);
(Continued)

(58) Field of Classification Search
CPC ............. H04L 63/0823; H04L 63/0853; H04L 63/061; H04L 63/0435; H04L 63/0442
(Continued)

(56) References Cited

U.S. PATENT DOCUMENTS

| | | |
|---|---|---|
| 2003/0023849 A1 | 1/2003 | Martin, Jr. |
| 2014/0122897 A1 | 5/2014 | Dodeja |

(Continued)

FOREIGN PATENT DOCUMENTS

| | | |
|---|---|---|
| EP | 1 023 703 B1 | 8/2000 |
| EP | 2273718 B1 | 6/2004 |

(Continued)

OTHER PUBLICATIONS

Bernstein, D.J. et al., "Factoring RSA keys from certified smart cards: Coppersmith in the wild"; (IACR Cryptology ePrint Archive; vol. 2013/599).
Whtye, William et al., "A Security Credential Management System for V2V Communications"; 2013 IEEE Vehicular Networking Conference (VNC) DOI: 10.1109/VNC.2013.6737583; Conference Paper Dec. 2013.
(Continued)

*Primary Examiner* — Carl G Colin
*Assistant Examiner* — Tarek Elarabi
(74) *Attorney, Agent, or Firm* — Daniel D. Hill

(57) ABSTRACT

A method is provided for generating a public/private key pair and certificate. The method includes providing an integrated circuit (IC) with an IC specific initial public and private key pair and a public key certificate signed by a manufacturer of the IC. A smartcard having stored thereon customer unique configuration data related to the IC is provided to a customer of the IC manufacturer. The smartcard enables the customer to generate a customization value and a customized public key using the customer unique configuration data. In response to the customer receiving the public key certificate signed by the IC manufacturer from the IC, the customer is enabled to provide the customization value, the customized public key, and a public key certificate signed by the customer to the IC. The IC is thus enabled to generate a customized private key, thus providing an IoT device with a public/private key pair and a certificate signed by the device manufacturer without the use of a trusted party.

20 Claims, 3 Drawing Sheets

(51) Int. Cl.
  *G06F 21/76* (2013.01)
  *G06K 19/077* (2006.01)
  *H04L 9/08* (2006.01)

(52) U.S. Cl.
  CPC ........ *G06K 19/07716* (2013.01); *H04L 9/083* (2013.01); *H04L 9/0877* (2013.01); *H04L 63/0435* (2013.01); *H04L 63/0442* (2013.01); *H04L 63/061* (2013.01); *H04L 63/0853* (2013.01)

(58) Field of Classification Search
  USPC ....................................................... 713/156
  See application file for complete search history.

(56) References Cited

U.S. PATENT DOCUMENTS

2017/0054566 A1* 2/2017 Nitschke ............... H04L 9/3265
2018/0167210 A1  6/2018 Brands

FOREIGN PATENT DOCUMENTS

EP    2 890 039 A1   7/2015
GB    2381172 B      6/2004

OTHER PUBLICATIONS

U.S. Appl. No. 15/377,840, filed Dec. 13, 2016, and titled "Distributed Cryptographic Key Insertion and Key Delivery".

* cited by examiner

METHOD FOR GENERATING A PUBLIC/PRIVATE KEY PAIR AND PUBLIC KEY CERTIFICATE FOR AN INTERNET OF THINGS DEVICE

BACKGROUND

Field

This disclosure relates generally to integrated circuits and more specifically to a method for generating a public key certificate for an internet of things (IoT) device incorporating an integrated circuit (IC).

Related Art

An asymmetric encryption system uses a public and private key pair to encrypt and decrypt data. In the asymmetric encryption system, a public key certificate is generated and a trusted party signs the certificate. In many Internet of Things (IoT) systems, each device in the system using asymmetric encryption needs to have a signed public-key certificate.

The public key certificate may be used to authenticate a device and verify a device's location and/or whether it is supposed to have access to certain resources. The public key certificate may also be used to establish the authenticity of messages, to establish or exchange secret keys, and otherwise secure communication within the IoT system. Generating a public key pair can be a relatively complex process that requires adequate security measures. It usually involves generating one or more random numbers suitable for cryptographic applications. Generating a random number is quite complicated to perform correctly and typically requires a True Random Number Generator (TRNG). Low-cost ICs for IoT systems are often not equipped with a suitable TRNG for cost reasons.

For ICs used in smartcards, the customer may directly order smartcard ICs to be customized and provided with key material according to their specifications. So-called Trust Provisioning services are built on a direct trust relationship between an integrated circuit (IC) manufacturer and the customer who is going to use the produced ICs. The IC manufacturer then configures a key insertion process to provide the right key data to the individual ICs during the wafer test step of the IC manufacturing process. Afterwards, the keys themselves are provided to the customer (or customer's representative) through a key delivery process. An on-line system may be set up through which the keys can be retrieved.

However, the situation with IoT-related products is quite different than that with smartcards. Typically, the ICs used in IoT devices are generic and functionally identical to each other, and the same IC is sold to every customer, who may be IC distributors. The distributors resell the ICs to the actual customers who integrate them into their IoT product designs. Also, the customers may actually use contract manufacturers to manufacture the devices. So there is typically no direct contact between the IC manufacturer and the customers who use the ICs, and therefore also no direct trust relationship. Because of this business model, the ICs are also not customized for a typical customer.

One problem the above scenario causes is how to provide ICs for IoT applications with a public/private key pair and a certificate when the customer may not want to trust the IC manufacturer to keep the keys secure. Another problem is that although the IC manufacturer may have the ability to provide public-key certificates, the customer does not necessarily want the IC manufacturer to be responsible for certifying the validity of a public-key pair, as this also gives the IC manufacturer a certain amount of control over the IoT system in addition to the IoT system's security. And vice versa, the IC manufacturer may not want to be held responsible for any security issues with the certificates after the ICs have been sold.

Generating a public key pair on an IC itself may not be desirable for security reasons, especially if the IC would have to perform the key generation in an insecure and uncontrolled environment where potentially an attacker could have access to the IC. For high-security ICs, such as those for smartcards, this may not be a real problem as these have been designed to withstand attacks. However, that is not the case for ICs intended for IoT applications. These ICs are typically relatively low-cost compared to smartcard ICs. So even though the IoT IC may be able to randomly generate suitable key pairs, additional security requirements need to be fulfilled, such as being in a secure environment.

Therefore, a need exists for a method to generate a signed public key certificate for a public/private key pair that solves at least some of the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
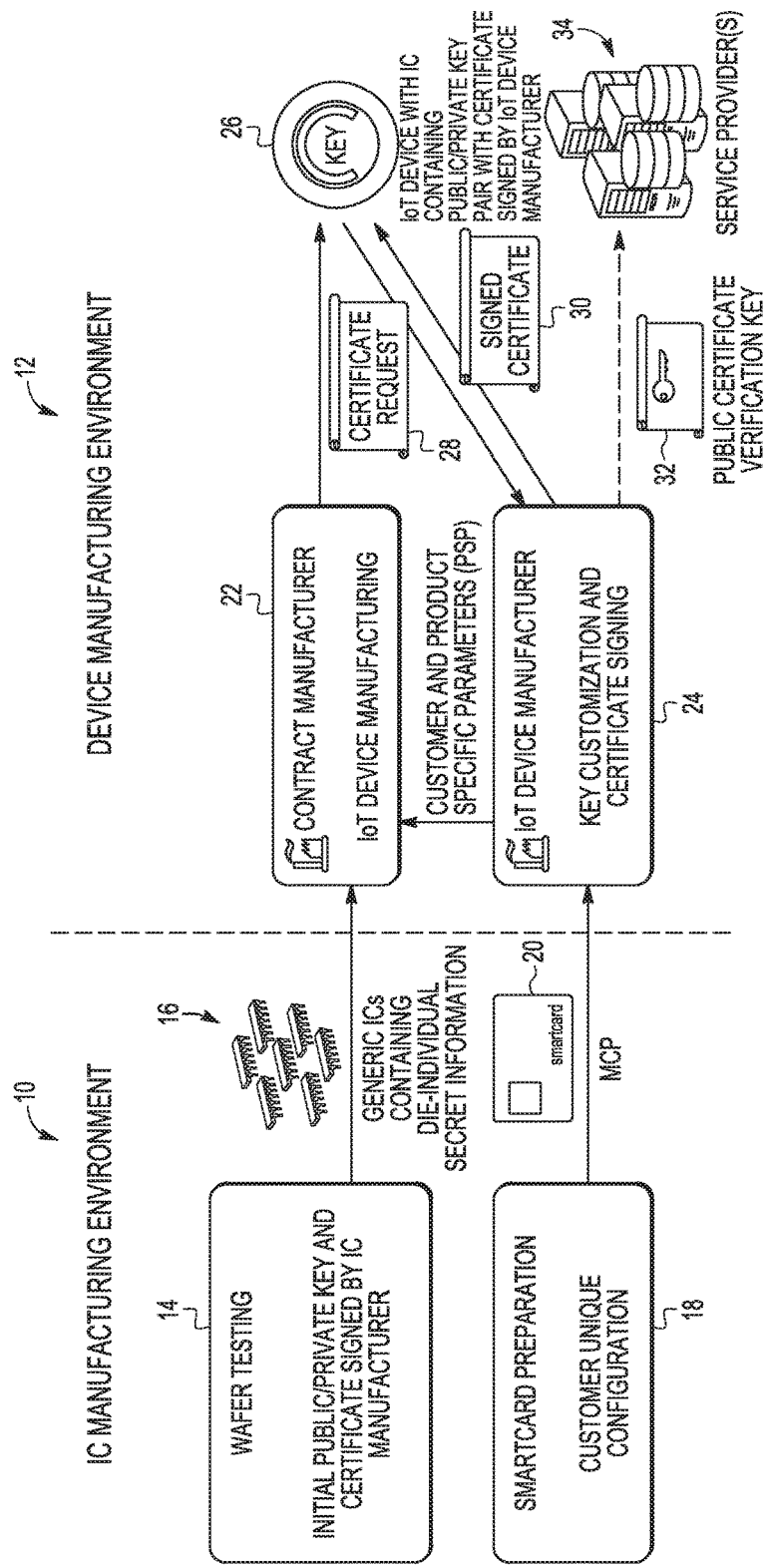
FIG. 1 illustrates a method for generating a public/private key pair and public key certificate for an IoT device.

Generally, there is provided, a method for generating a public/private key pair and signed public key certificate for an IoT device. The method includes an IC manufacturer providing an IC to be used in the IoT device with initial IC specific public/private key pairs and accompanying signed public key certificates. The IC manufacturer also provides to the customer a smartcard having customer unique configuration data related to the ICs delivered to the customer. The smartcard enables the customer to generate a customization value and customized public keys using the customer unique configuration data. The customer retrieves the public key certificate, signed by the IC manufacturer, from an IC. The customer is then enabled to provide a customization value, a customized public key, and a public key certificate for the customized public key signed by the customer to the IC. The information provided by the customer enables the IC to generate a customized private key to accompany the customized public key and public key certificate. Generated in this way, neither the customer nor the IC manufacturer has knowledge of the resulting customized private key that the customer put in its devices. Also no other party, such as distributors, other customers of the same type of IC and other external parties, can have access to or gain knowledge of the resulting private keys. If the customer makes use of contract manufacturing, no secure environment or connection is needed at or to the manufacturing floor. Because the customers are responsible for signing the certificates, the IC manufacturer has no control over, or responsibility for, the validity of the certificates.

In accordance with an embodiment, there is provided, a method comprising: providing an integrated circuit (IC) with an IC specific initial public and private key pair and a public key certificate signed by a manufacturer of the IC, to a customer of the IC manufacturer; and providing a smartcard to the customer, the smartcard having stored thereon customer unique configuration data related to the IC; wherein the smartcard enables the customer to generate a customization value and a customized public key for an IoT device using the customer unique configuration data, and wherein in response to the customer receiving the public key certificate signed by the IC manufacturer from the IC, the customer is enabled to provide the customization value, the customized public key, and a public key certificate signed by the customer to the IC, and wherein the IC is enabled to generate a customized private key for the IoT device. The customization value may be encrypted by the smartcard. The method may further comprise generating the public key certificate on the smartcard. Providing an IC with an IC specific initial public and private key pair and a public key certificate signed by a manufacturer of the IC may further comprise providing the IC with a unique ID. Providing an IC with an IC specific initial public and private key pair and a public key certificate signed by a manufacturer of the IC may further comprise providing the IC during a wafer testing phase of the IC. The method may further comprise providing encryption parameters including an elliptic curve $E(\mathbb{Z}_p)$ of order n (prime). Providing the IC may be performed by the IC manufacturer. The customer may be characterized as being an internet of things (IoT) device manufacturer. The method may further comprise providing, by the IC manufacturer, an IC-specific symmetric key in the IC device during wafer testing of a semiconductor wafer including the IC device. The method may further comprise establishing a secured communication channel between the IC and the smartcard for the exchange of confidential information.

In another embodiment, there is provided, a method comprising: inserting into an integrated circuit (IC) a specific initial public and private key and a public key certificate signed by a manufacturer of the IC; storing device manufacturer unique configuration data in smartcard; providing the IC and the smartcard to an internet of things (IoT) device manufacturer, wherein the IC is to be used by the IoT device manufacturer in an IoT device, and wherein the smartcard enables the device manufacturer to generate a customization value and a customized public key using the device manufacturer unique configuration data, and wherein in response to the device manufacturer receiving from the IC the public key certificate signed by the IC manufacturer, the device manufacturer is enabled to provide the customization value, the customized public key, and a public key certificate signed by the device manufacturer to the IC, and wherein the IC is enabled to generate a customized private key. The customization value may be encrypted by the smartcard. The method may further comprise generating the public key certificate on the smartcard. Providing an IC with an IC specific initial public and private key pair and a public key certificate signed by a manufacturer of the IC may further comprise providing the IC with a unique ID. Providing an IC with an IC specific initial public and private key pair and a public key certificate signed by a manufacturer of the IC may further comprise providing the IC during a wafer testing phase of the IC. The method may further comprise providing encryption parameters including an elliptic curve $E(\mathbb{Z}_p)$ of order n (prime). Providing the IC may further comprise providing the IC to a contract manufacturer of the IoT device manufacturer. The (IoT) device is manufactured by a contract manufacturer of the device manufacturer. The method may further comprise providing, by the IC manufacturer, an IC-specific symmetric key in the IC device during wafer testing of a semiconductor wafer including the IC device. The method may further comprise establishing a secured communication channel between the IC and the smartcard for the exchange of confidential information.

FIG. 1 illustrates a method for generating a public/private key pair and public key certificate for an IoT device in accordance with an embodiment. In the method an IC and smartcard having customized information are provided to enable a customer to create a customized private key and a public key certificate signed by the customer. In the disclosed embodiment, an IC manufacturer sells ICs to an IoT device manufacturer who will incorporate the ICs into an IoT device. In the following description, the terms "IoT device manufacturer" and "customer" are used interchangeably. For discussion purposes, the customer or IoT device manufacturer is considered a customer of the IC manufacturer, either directly, or indirectly through a distributor. FIG. 1 includes an IC manufacturing environment 10 and an IoT device manufacturing environment 12. A resulting IoT device 26 is manufactured having a public/private key pair with a public key certificate signed by the IoT device manufacturer. In IC manufacturing environment 10, wafer testing 14 is performed on semiconductor wafers having a plurality of semiconductor die. The die are tested prior to the die being singulated into individual die and packaged to form completed ICs 16 to save the cost of packaging defective die. During wafer testing, initial public and private keys, specific for each die and forming a key pair, are inserted into each die by the IC manufacturer. Also, a public key certificate, signed by the IC manufacturer, is provided. In addition, die individual secret information is inserted into each die. In another embodiment, the key pair, certificate, and secret information may be inserted during a different manufacturing phase, for example, during final test. The initial public and private key and certificate signed by the IC manufacturer will not be used in the final IoT device except for obtaining the customization value, customized public key and certificate.

Also, in IC manufacturing environment 10, the IC manufacturer performs a smartcard preparation step 18. Smartcard 20 is prepared for a specific customer that wants to make use of ICs 16 in an IoT device it manufactures. Each customer receives a smartcard with different customized information. During smartcard preparation, the IC manufacturer inserts customer unique configuration data related to ICs 16, such as for example, a manufacturer configuration parameter (MCP). After ICs 16 and smartcard 20 are completed, they can be delivered according to the needs of a specific customer. The IC manufacturing environment 10 will be discussed in more detail in the discussion of FIG. 2.

In IoT device manufacturing environment 12 of FIG. 1, ICs 16 may be delivered to a contract manufacturer for incorporating into an IoT device as illustrated at step 22. Alternately, the role of the contract manufacturer may be performed by the IoT device manufacturer. At step 24, smartcard 20 is received by the device manufacturer, where key customization and public key certificate signing occurs. Also, product specific parameters (PSP) may be delivered to the contract manufacturer for incorporation into ICs 16. The smartcard 20 enables the customer to generate, for each IC, a customization value (k) and a customized public key using the customer unique configuration data. Also, in response to the customer receiving the public key certificate signed by the IC manufacturer from the IC, the customer is enabled to provide the customization value, the customized public key, and a public key certificate signed by the customer to the IC. The final IoT device 26 sends a public key certificate 28 to the device manufacturer, and in return, receives public key certificate 30 for the customized public key and signed by the device manufacturer. At this point, the IC is enabled to generate a customized private key. A certificate signature verification key 32 is published by the IoT device manufacturer, so that customers of the device manufacture can use the key to verify the signatures on these certificates. The ICs may be sold through normal distribution channels. Additionally, the public certificate verification key 32 may be provided to third parties, such as Internet service provider(s) 34 for determining if IoT device 26 is authorized to receive services.

Figure 2:
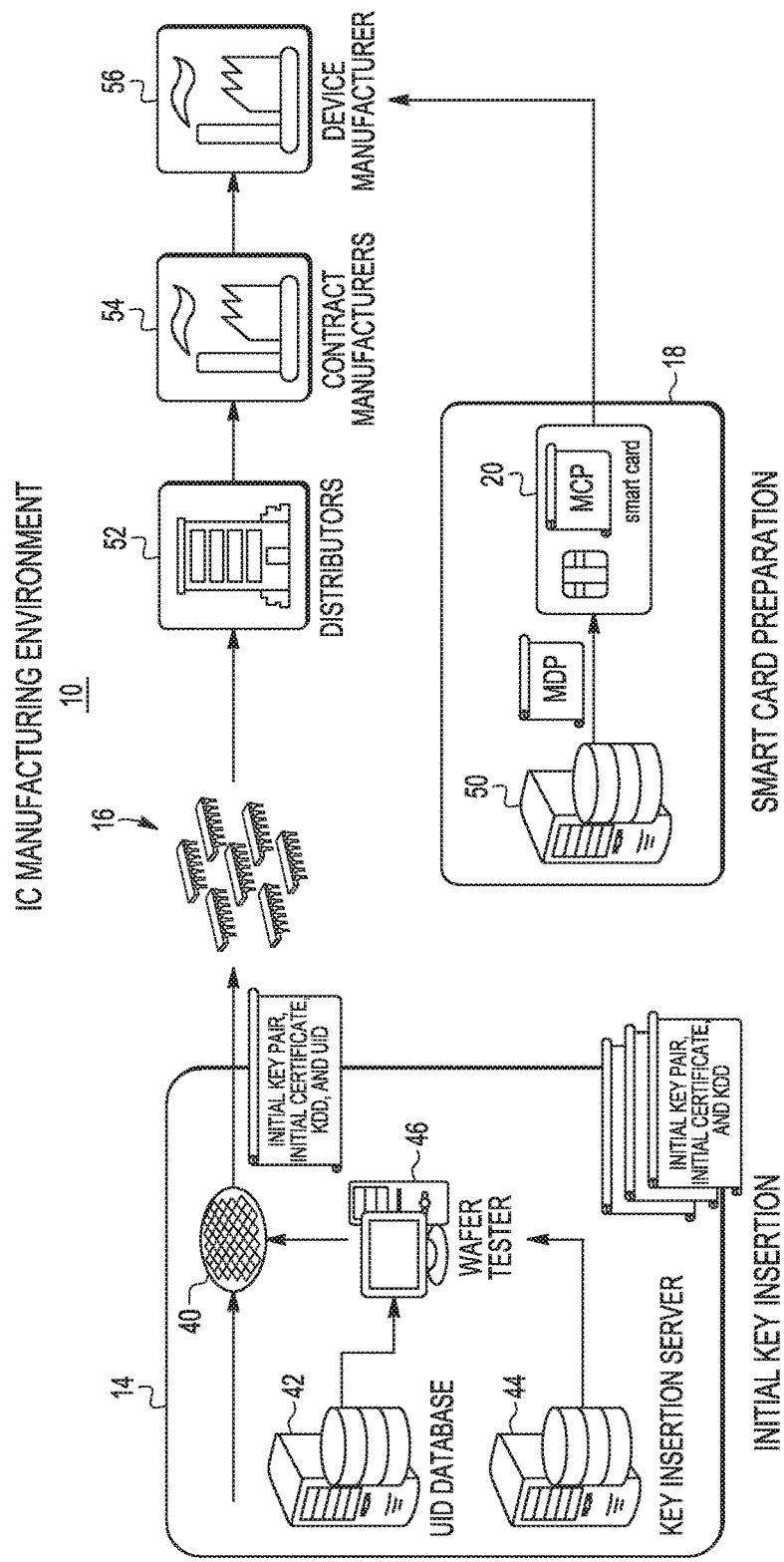
FIG. 2 illustrates the IC manufacturing environment portion of the method of FIG. 1 in more detail.

FIG. 2 illustrates a portion of the method of FIG. 1, relating to IC manufacturing environment 10, in more detail. In IC manufacturing environment 10 an initial key pair is inserted into the ICs and a smartcard is prepared with customer (IoT device manufacturer) unique information. The information on the smartcard will enable the device manufacturer to perform a finalization step during IoT device testing and provide a customized public key certificate signed by the device manufacturer to be loaded into the IC. During wafer testing at an IC manufacturer's IC manufacturing facility, an initial public/private key pair is prepared and inserted into each IC die. At step 14, a UID database 42 provides a unique ID (UID), and key insertion server 44 provides the initial key pair, initial certificate signed by the IC manufacturer, and secret key derivation data (KDD) to a wafer tester 46 for each of the IC die being processed. The ICs 16 can then be delivered to one or more of an IC distributor 52 for resale, a contract manufacturer 54 that is under contract to an IoT device manufacturer, or to a IoT device manufacturer 56.

Smartcard 20 is prepared specifically for a particular customer at step 18 using smartcard preparation server 50. During smartcard preparation, the IC manufacturer inserts customer unique configuration data related to ICs 16, such as for example, a manufacturer configuration parameter (MCP). After ICs 16 and smartcard 20 are completed, they can be delivered according to the needs of a specific customer. The customer is thus enabled by the IC manufacturer to generate the customized public keys and public key certificates signed by the customer.

During IC wafer testing, the IC manufacturer inserts all the necessary parameters for the establishment of the symmetric device specific key (DSK). Next, the IC manufacturer inserts into every IC an IC-specific private/public key pair accompanied by a public key certificate signed by the IC manufacturer. This enables the establishment of a IC-specific secret symmetric key, device-specific key (DSK) known only to the device containing the IC and to the customer.

Figure 3:
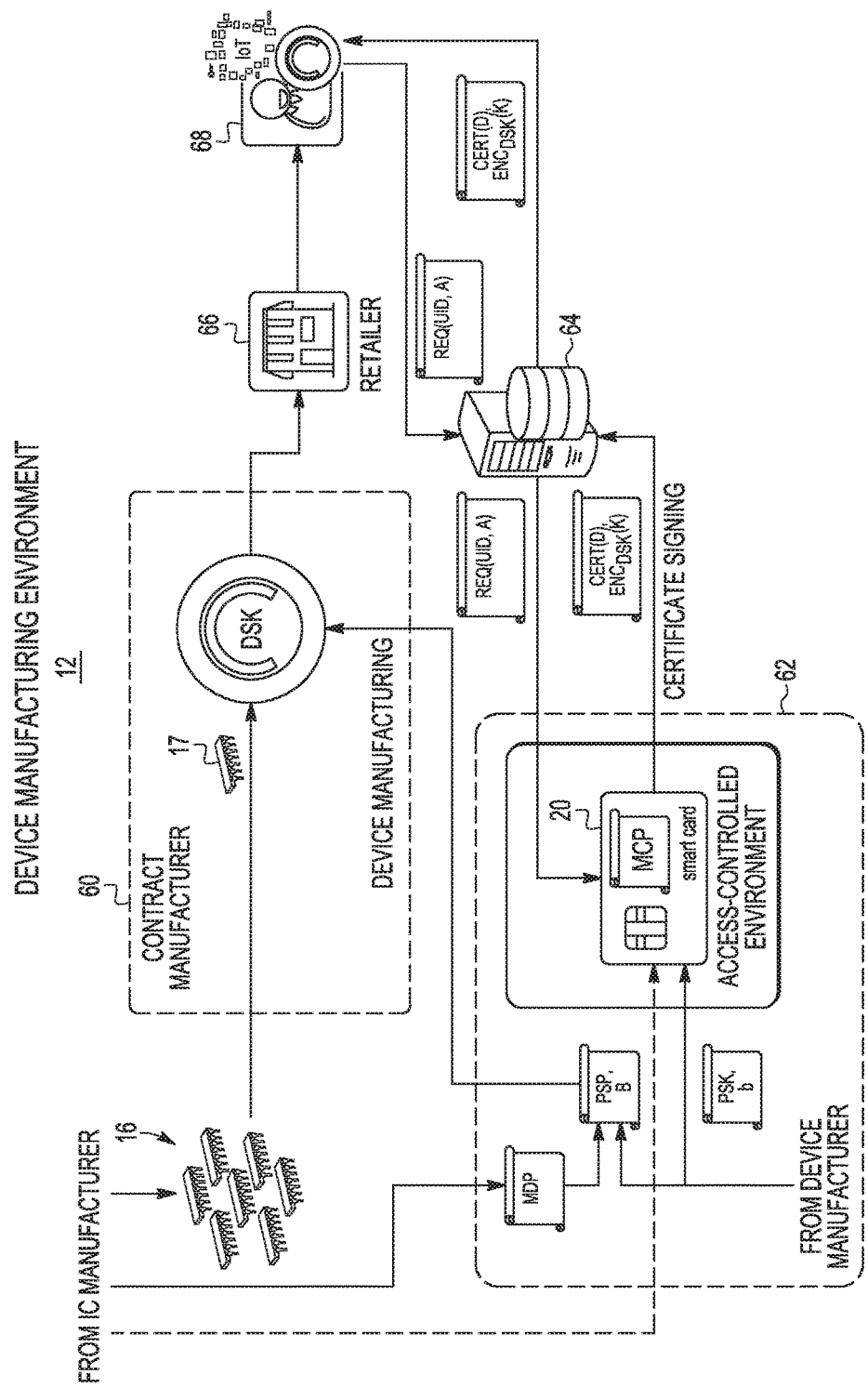
FIG. 3 illustrates the IoT device manufacturing environment portion of the method FIG. 1 in more detail.

FIG. 3 illustrates a portion of the method FIG. 1 in more detail for the IoT device manufacturing environment 12. In FIG. 3 and the following discussion, (A, a) are the initial public/private key pair provided by the IC manufacturer, (B, b) are the generated signature public/private signature key pair, (D, d) are the customized public/private key pair, and k is a secret customization value. ICs 16 are delivered to an IoT device manufacturer which may be a contract manufacturer, at step 60. Also, the IC manufacturer provides smartcard 20, prepared in the IC manufacturer facility, as described above and illustrated in FIG. 2. In addition, a manufacturer diversification parameter (MDP) is provided to the device manufacturer. The IC with the initial public/private key pair and the certificate signed by the IC manufacturer enable the customer to generate with the smartcard a customized key pair and certificate signed by the customer.

When a customer wants to design such an IC into their product, they contact the IC manufacturer. The customer requests from the IC manufacturer a smart card that is personalized with customer-unique configuration data. The customer also prepares data for the establishment of the secret symmetric device-specific key (DSK) as illustrated in FIG. 3. At step 62, in an access-controlled environment, the device manufacturer provides a product specific parameter (PSP) and a product specific key (PSK) to the smartcard. The PSP and MDP are used to generate a DSK in the IC, such as IC 17, in step 60. The IoT device is then ready to be provided to a retailer 66. All newly manufactured IoT devices will be able to generate a DSK that can also be calculated by the customer, using smartcard 20. This enables the establishment of a secured communication channel, that can then be used to exchange confidential information securely between the IC and the IoT device manufacturer.

Upon first start-up, an IoT device 68 having the prepared IC will contact the customer's on-line back-end system 64 over the internet and then submit its certificate as it is stored inside the IC. The certificate is signed by the IC manufacturer. This signature is verified by smart card 20, which contains the public verification key. If the signature is verified correctly, smart card 20 will then generate a random value, a customization value (k), that is used to create a customized public key value for the device. The k is then encrypted using the DSK and output from smart card 20. Also the customized public key value is output. A new public key certificate can then be created and signed for the customized public key by the customer. Alternatively, the signing could take place inside smartcard 20, but this has no special security advantages. The encrypted k and the newly signed certificate for the customized public key is then delivered to the IoT device. Upon receipt of the encrypted k and the new certificate, the device will also calculate the DSK. It will then decrypt the encrypted k to obtain the k. Using the k and the original private key it can then calculate a customized private key. The customized private key is then used to reconstruct the customized public key and the result of the reconstruction is compared to the customized public key that is contained in the new certificate. If the comparison succeeds, the new customized private key and the new certificate are stored inside the IC.

To enable the generation of the key pair, the IC manufacturer chooses public system parameters: a large prime number p, an elliptic curve $E(\mathbb{Z}_p)$ of order n (prime), and a generator $G \in_\mathcal{R} E(\mathbb{Z}_p)$. The IC manufacturer provides certificate signature key pair ($Pub_{MNF}$, $Priv_{MNF}$). An IC receives an IC-individual (random) private key $a \in_\mathcal{R} \mathbb{Z}_n$, public key $A := a \cdot G$, and certificate $Cert_{MNF}(A)$, signed using $Priv_{MNF}$.

The customer's smartcard 20 contains certificate signature public key $Pub_{MNF}$. The smartcard receives certificate $Cert_{MNF}(A)$ from the IC, verifies the signature and, if successful, extracts A. It then generates a random value $k \in_\mathcal{R} \mathbb{Z}_n$ and calculates the customized public key $D := A + k \cdot G$. The smartcard also calculates the DSK and outputs D and $Enc_{DSK}(k)$.

To calculate the DSK, the IC manufacturer chooses a large prime p, elliptic curve $E(\mathbb{Z}_p)$ of order (prime) n and a generator $G \in_R E(\mathbb{Z}_p)$ (all public). Also, a random product key $PK \in_R \mathbb{Z}_n$ (secret) is chosen. For each IC the IC manufacturer chooses a random $KDD \in_R \mathbb{Z}_n$ and calculates $UID=(KDD \cdot PK) \cdot G$. For each customer, the IC manufacturer chooses $MCP \in_R \mathbb{Z}_n$ and calculates $MDP=(MCP \cdot PK) \cdot G$. Only the IC manufacturer can generate from KDD, the UID, MCP and MDP.

The IoT device manufacturer chooses $PSK \in_R \mathbb{Z}_n$ (secret) and calculates $PSP=PSK \cdot MDP$. The IC calculates $DSK=KDD \cdot PSP$, and the DSK is stored in the IC, PSP and KDD can be deleted. The smartcard calculates $DSK=(PSK \cdot MCP)UID$ and uses DSK to encrypt k. The IoT device manufacturer creates a certificate $Cert_{Cust}(D)$ and delivers the certificate, together with $Enc_{DK}(k)$, back to the device. The IC in the IoT device calculates DSK and decrypts $Enc_{DSK}(k)$ to obtain k. The IC reconstructs the customized private key $d:=a+k$. The IC extracts D from $Cert_{Cust}(D)$ and checks that $D \equiv d \cdot G$. If the values match, the IC stores d and $Cert_{Cust}(D)$.

By using the smartcard with the IC as described above, neither the IoT device manufacturer nor the IC manufacturer has knowledge of the resulting private key that the IoT device manufacturer inserted in their devices. Also no other party, such as distributors, other customers of the same type of IC and other external parties, can have access to or gain knowledge of the resulting private keys. If the IoT device manufacturer makes use of contract manufacturing, no secure environment or connection is needed at or to the manufacturing floor of the contract manufacturer. Because the IoT device manufacturers are responsible for signing the certificates, the IC manufacturer has no control over, or responsibility for, the validity of the certificates.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   providing an integrated circuit (IC) with an IC specific initial public and private key pair and a public key certificate signed by a manufacturer of the IC, to a customer of the IC manufacturer; and
   providing a smartcard to the customer, the smartcard having stored thereon customer unique configuration data related to the IC;
   wherein the smartcard enables the customer to generate a customization value and a customized public key for an Internet of Things (IoT) device using the customer unique configuration data, and wherein in response to the customer receiving the public key certificate signed by the IC manufacturer from the IC, the customer is enabled to provide the customization value, the customized public key, and a public key certificate signed by the customer to the IC, and wherein the IC is enabled to generate a customized private key for the IoT device.

2. The method of claim 1, wherein the customization value is encrypted by the smartcard.

3. The method of claim 2, further comprising providing encryption parameters including an elliptic curve E(Zp) of order n (prime).

4. The method of claim 1, further comprising generating the public key certificate on the smartcard.

5. The method of claim 1, wherein providing an IC with an IC specific initial public and private key pair and a public key certificate signed by a manufacturer of the IC further comprises providing the IC with a unique ID.

6. The method of claim 1, wherein providing an IC with an IC specific initial public and private key pair and a public key certificate signed by a manufacturer of the IC further comprises providing the IC during a wafer testing phase of the IC.

7. The method of claim 1, wherein providing the IC is performed by the IC manufacturer.

8. The method of claim 1, wherein the customer is characterized as being an internet of things (IoT) device manufacturer.

9. The method of claim 1, further comprising providing, by the IC manufacturer, an IC-specific symmetric key in the IC device during wafer testing of a semiconductor wafer including the IC device.

10. The method of claim 1, further comprising establishing a secured communication channel between the IC and the smartcard for the exchange of confidential information.

11. A method comprising:
    inserting into an integrated circuit (IC) a specific initial public and private key and a public key certificate signed by a manufacturer of the IC;
    storing device manufacturer unique configuration data in smartcard;
    providing the IC and the smartcard to an Internet of Things (IoT) device manufacturer, wherein the IC is to be used by the IoT device manufacturer in an IoT device, and wherein the smartcard enables the device manufacturer to generate a customization value and a customized public key using the device manufacturer unique configuration data, and wherein in response to the device manufacturer receiving from the IC the public key certificate signed by the IC manufacturer, the device manufacturer is enabled to provide the customization value, the customized public key, and a public key certificate signed by the device manufacturer to the IC, and wherein the IC is enabled to generate a customized private key.

12. The method of claim 11, wherein the customization value is encrypted by the smartcard.

13. The method of claim 12, further comprising providing encryption parameters including an elliptic curve E(7Z,) of order n (prime).

14. The method of claim 11, further comprising generating the public key certificate on the smartcard.

15. The method of claim 11, wherein providing an IC with an IC specific initial public and private key pair and a public key certificate signed by a manufacturer of the IC further comprises providing the IC with a unique ID.

16. The method of claim 11, wherein providing an IC with an IC specific initial public and private key pair and a public key certificate signed by a manufacturer of the IC further comprises providing the IC during a wafer testing phase of the IC.

17. The method of claim 11, wherein providing the IC further comprises providing the IC to a contract manufacturer of the IoT device manufacturer.

18. The method of claim 11, wherein the (IoT) device is manufactured by a contract manufacturer of the device manufacturer.

19. The method of claim 11, further comprising providing, by the IC manufacturer, an IC-specific symmetric key in the IC device during wafer testing of a semiconductor wafer including the IC device.

20. The method of claim 11, further comprising establishing a secured communication channel between the IC and the smartcard for the exchange of confidential information.

* * * * *